United States Patent [19]

Jackson

[11] Patent Number: 4,608,725
[45] Date of Patent: Sep. 2, 1986

[54] LITTER RETRIEVING MACHINE
[75] Inventor: Samuel G. Jackson, Lubbock, Tex.
[73] Assignee: Proficient Systems, Inc., Dallas, Tex.
[21] Appl. No.: 704,078
[22] Filed: Feb. 21, 1985
[51] Int. Cl.⁴ .............................................. E01H 15/00
[52] U.S. Cl. ................................................ 15/3; 15/84;
 56/328 R; 298/22 D
[58] Field of Search ............... 15/83, 84, 85, 340,
 15/3; 298/22 D, 22 J; 171/19, 45, 63; 56/328 R

[56] References Cited
U.S. PATENT DOCUMENTS

| | | |
|---|---|---|
| 667,580 | 2/1901 | Rogers . |
| 1,035,613 | 8/1912 | Lint . |
| 1,859,980 | 5/1932 | Mueller . |
| 1,879,905 | 9/1932 | Liebfried . |
| 2,298,145 | 10/1942 | Merrylees . |
| 2,539,596 | 1/1951 | Smith . |
| 2,581,662 | 1/1952 | Hutchinson ...................... 298/22 D |
| 2,599,715 | 6/1952 | Lepper . |
| 2,642,306 | 6/1953 | Beeler . |
| 2,666,665 | 1/1954 | Whitcher et al. . |
| 2,694,284 | 11/1954 | Kortz . |
| 2,792,253 | 5/1957 | Bliss . |
| 2,804,336 | 8/1957 | Thompson . |
| 2,928,225 | 3/1960 | Spencer . |
| 3,034,831 | 5/1962 | Biszantz et al. ................... 298/22 D |
| 3,162,877 | 12/1964 | Schmidt et al. .......................... 15/83 |
| 3,362,480 | 1/1968 | Barber . |
| 3,451,488 | 6/1969 | Taketa . |
| 3,483,687 | 12/1969 | Tanner, Jr. . |
| 3,534,535 | 10/1970 | Reynolds et al. . |
| 3,712,039 | 1/1973 | Avis . |
| 3,712,660 | 1/1973 | Moore . |
| 3,739,855 | 6/1973 | Bliss . |
| 3,807,154 | 4/1974 | Moore . |
| 3,888,370 | 6/1975 | Gamblin . |
| 3,908,842 | 9/1975 | Place ................... 298/22 J |
| 3,923,101 | 12/1975 | Donohue . |
| 3,993,141 | 11/1976 | Donohue . |
| 4,363,151 | 12/1982 | Knowlton ............................. 15/83 |

Primary Examiner—Edward L. Roberts
Attorney, Agent, or Firm—Litman, Day and McMahon

[57] ABSTRACT

An apparatus for collecting litter from roadways and grounds includes a ground engageable rotating drum with easily removable and replaceable fingers which slip in and out of channels mounted on the drum. A spring finger assembly rotates against the drum to aid in litter pickup and to strip material from the drum and deposit same on a conveyor. The conveyor directs the litter into a hopper, which, when full, is lifted by an arrangement of pivots and linkage arms to raise upwardly, then swing rearwardly and tip to dump the litter into a suitable receptacle.

4 Claims, 21 Drawing Figures

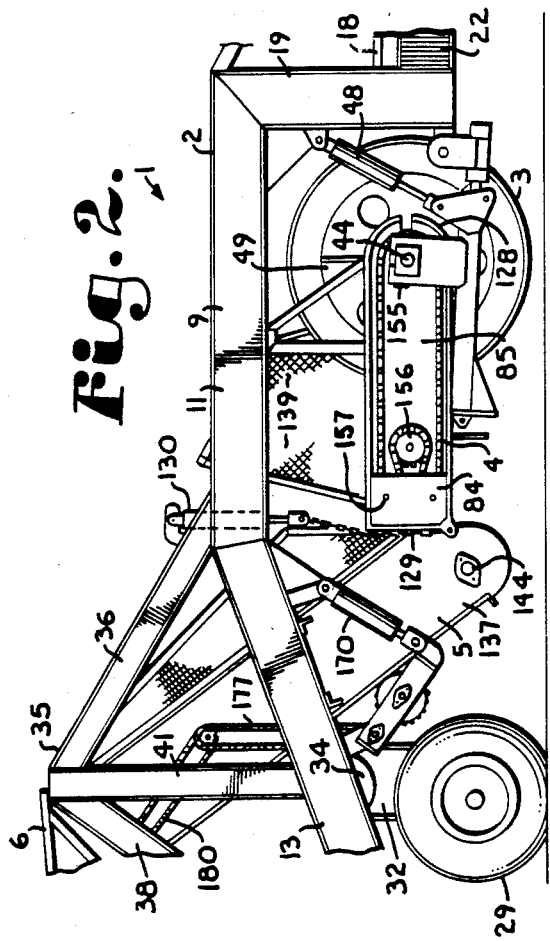
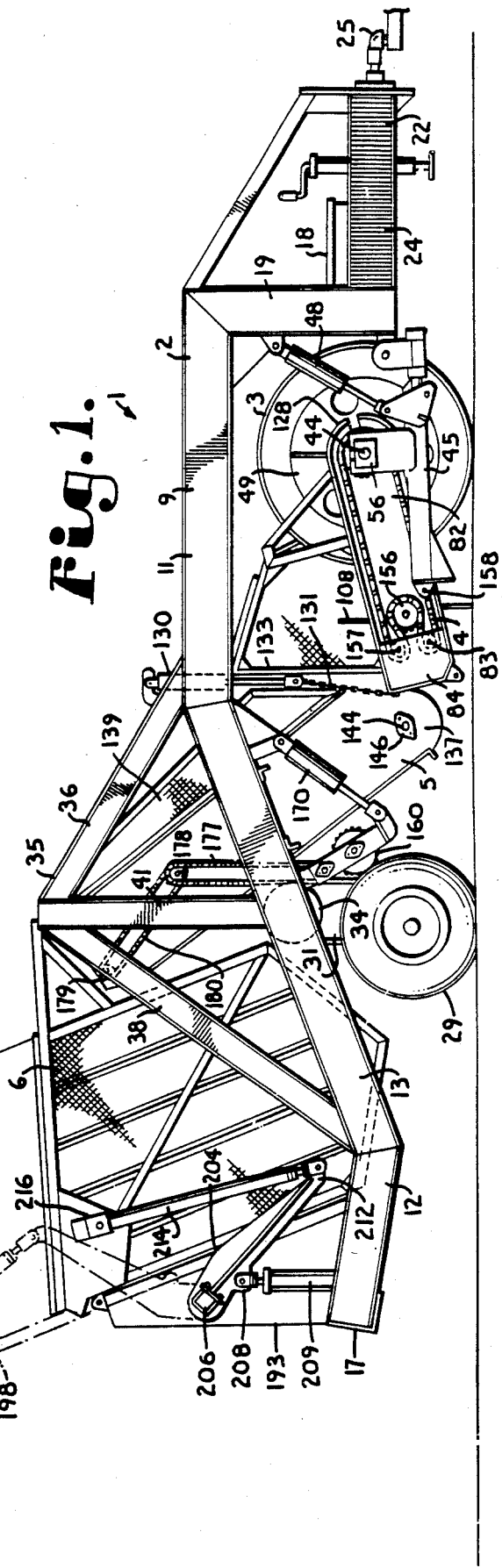

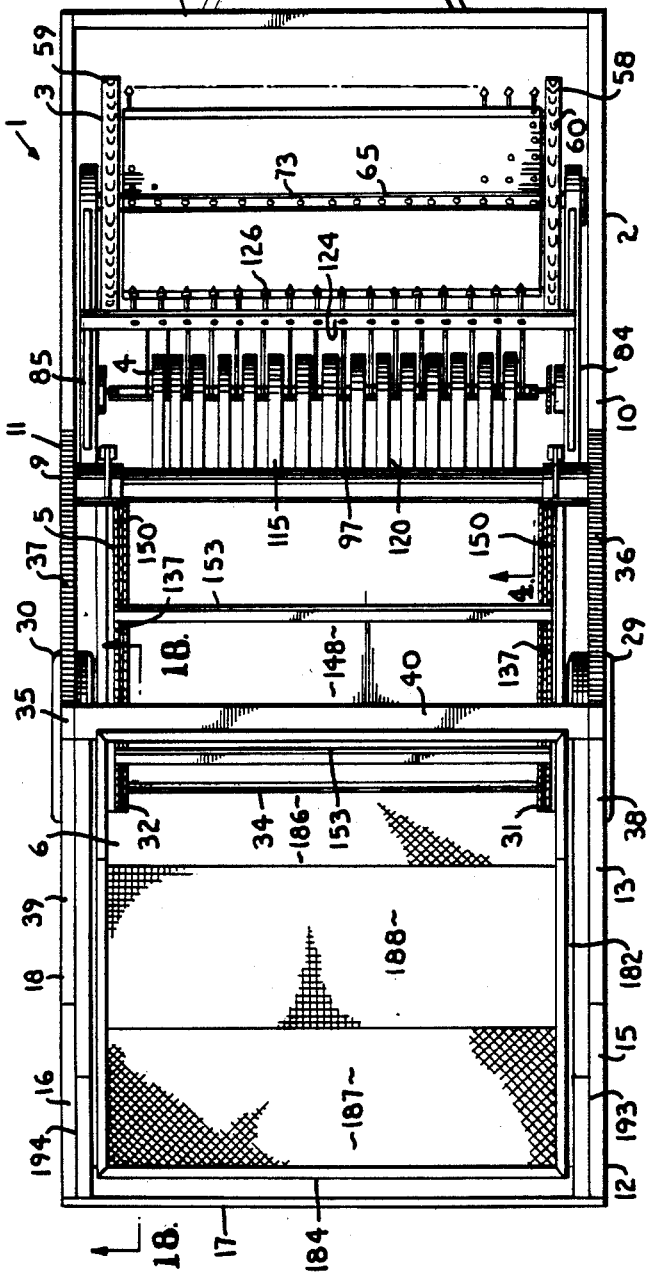
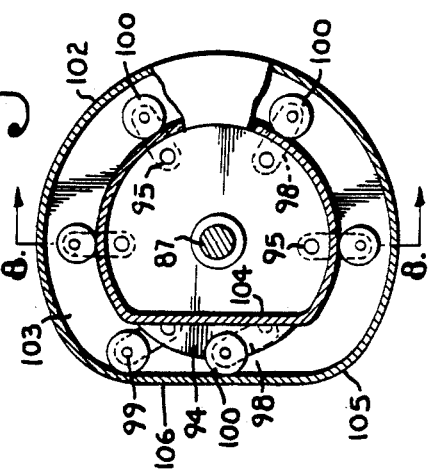
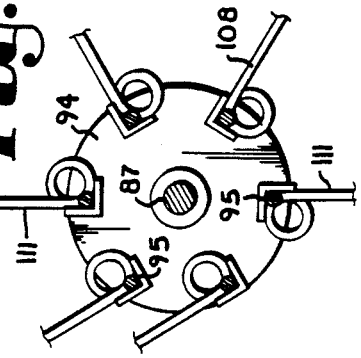
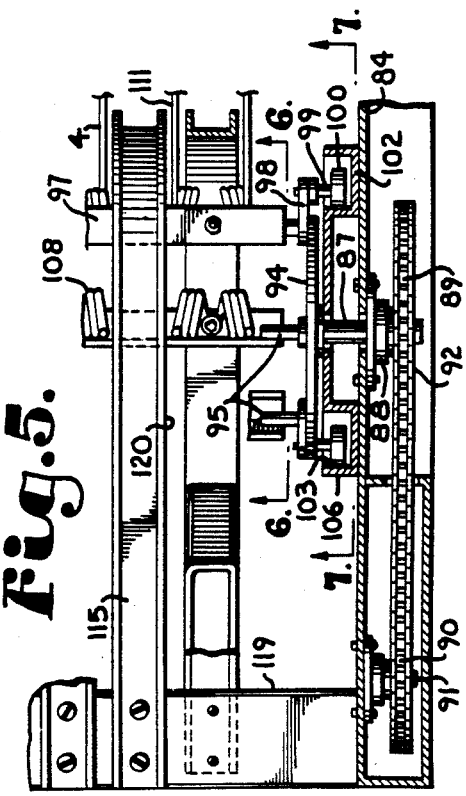

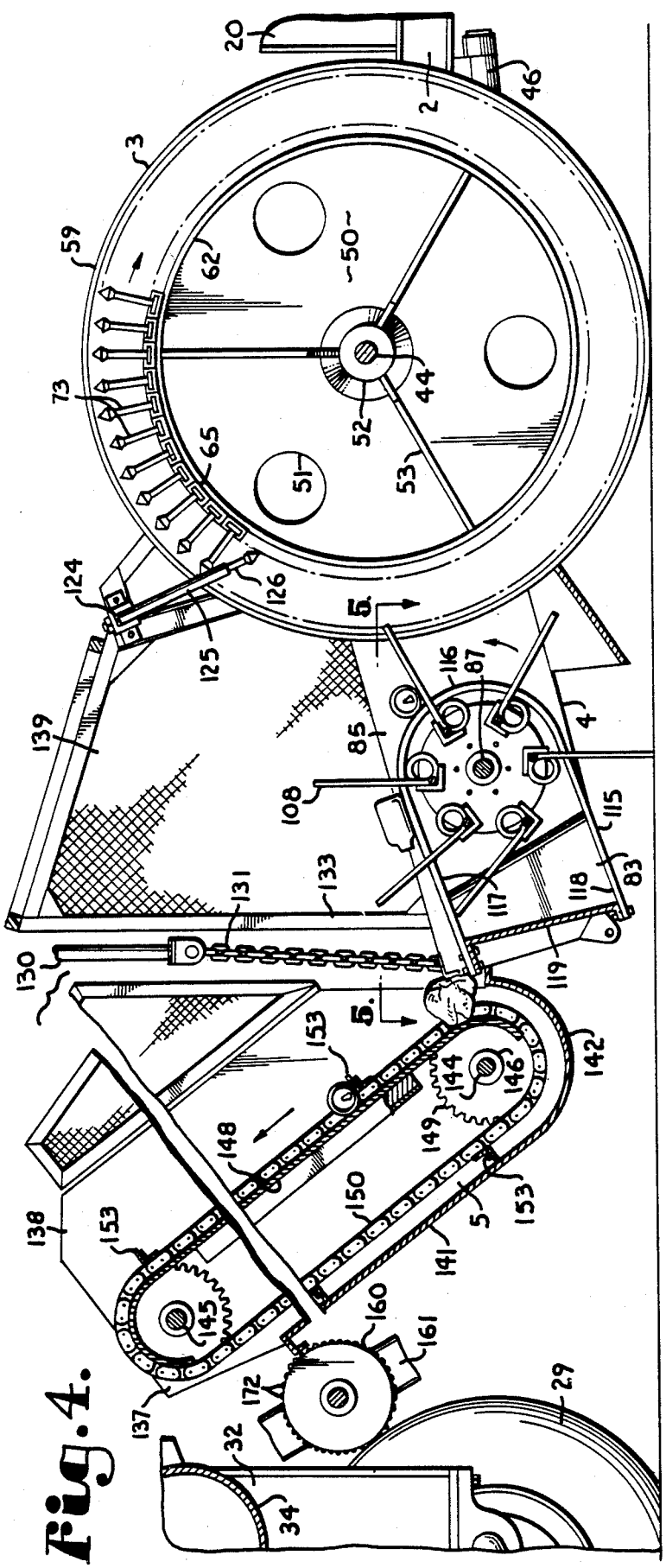

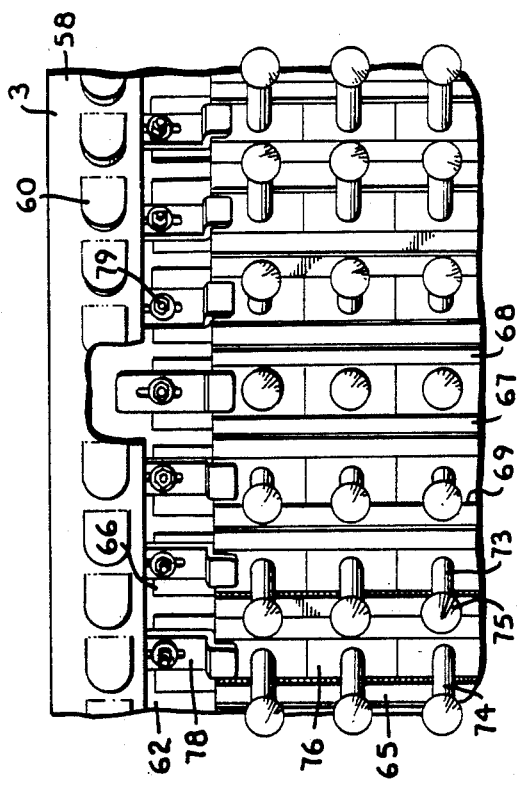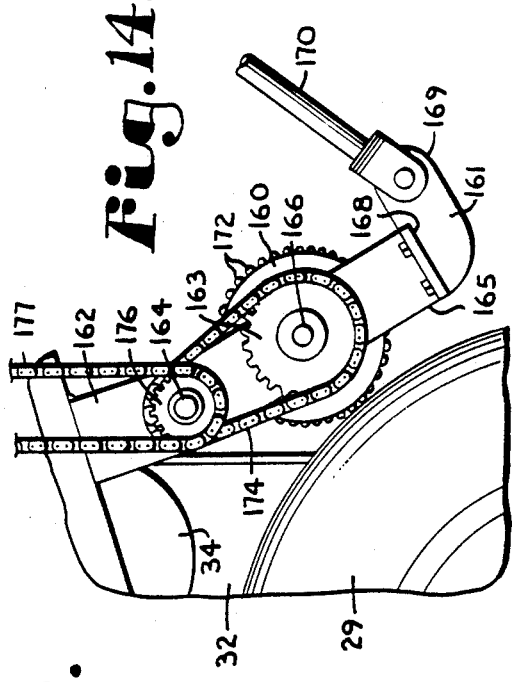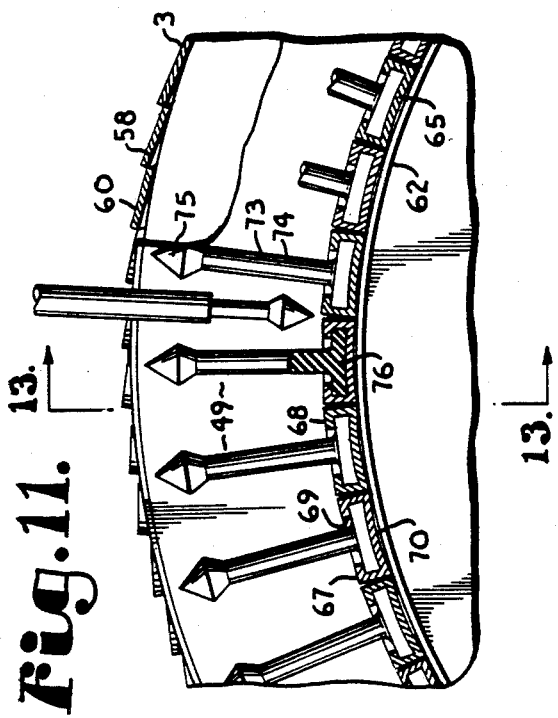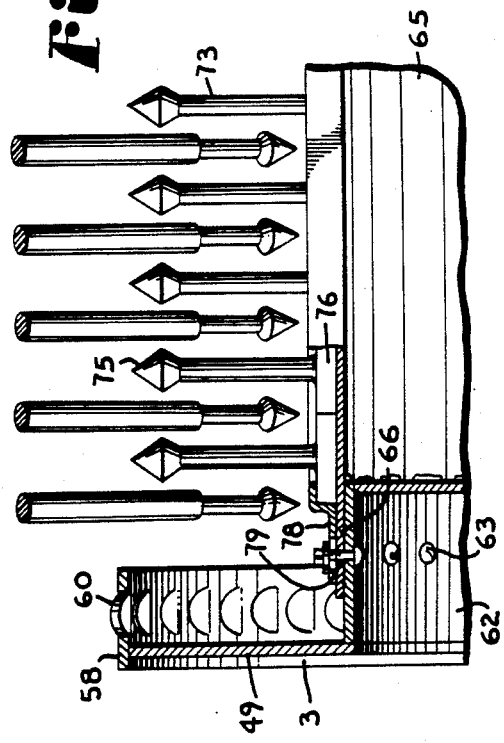

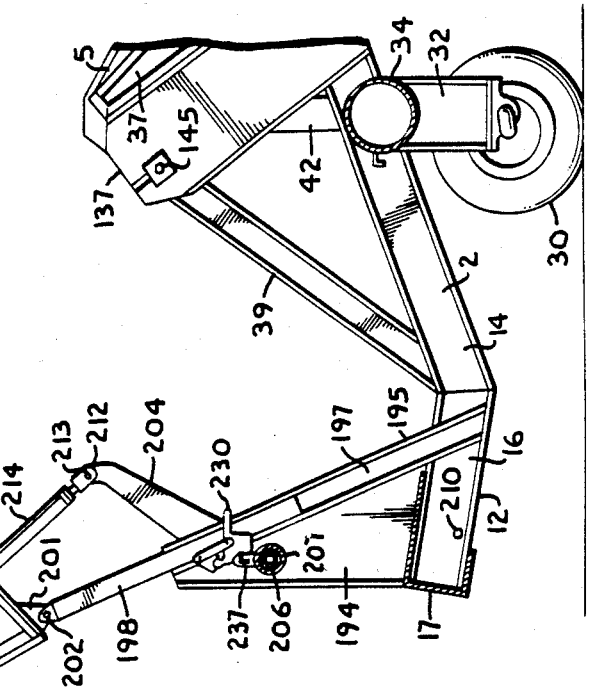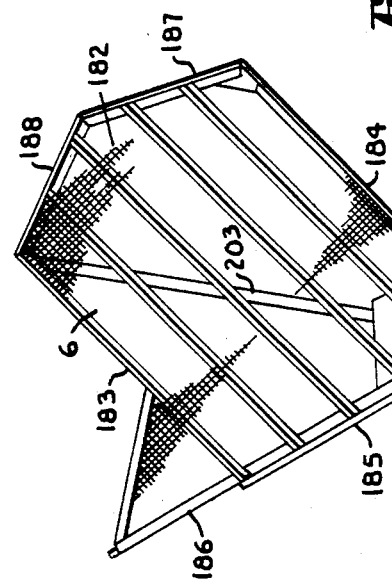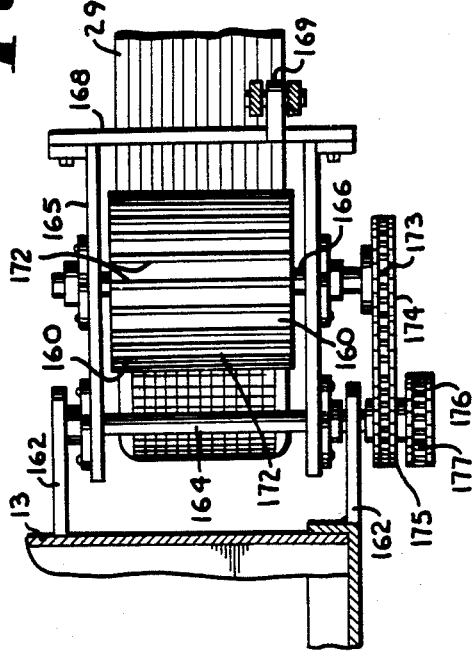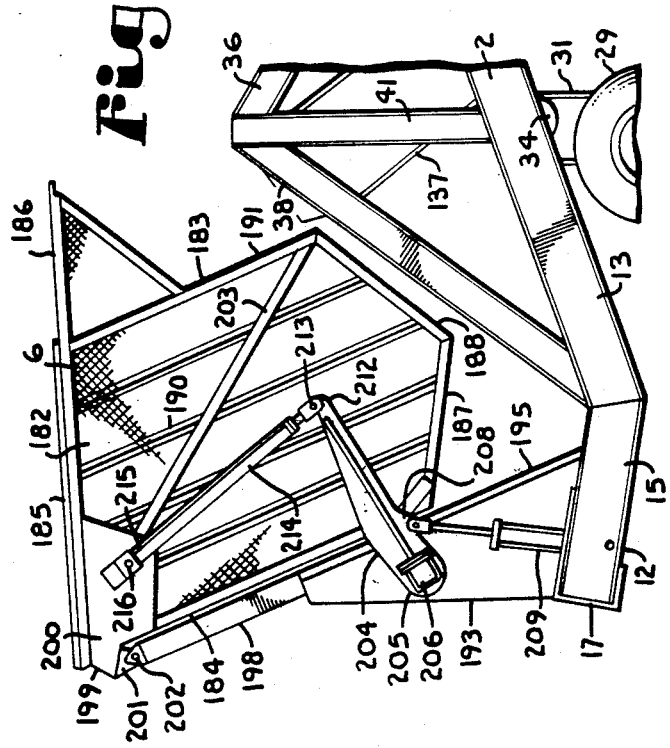

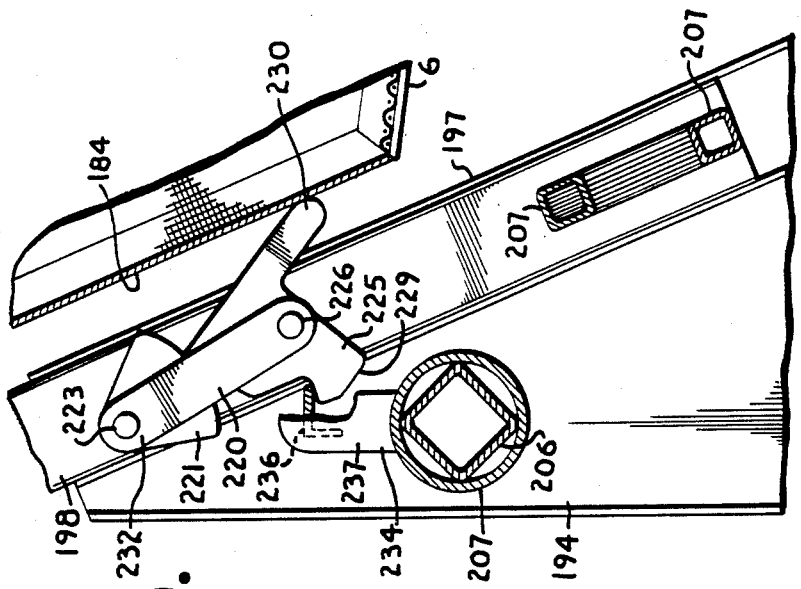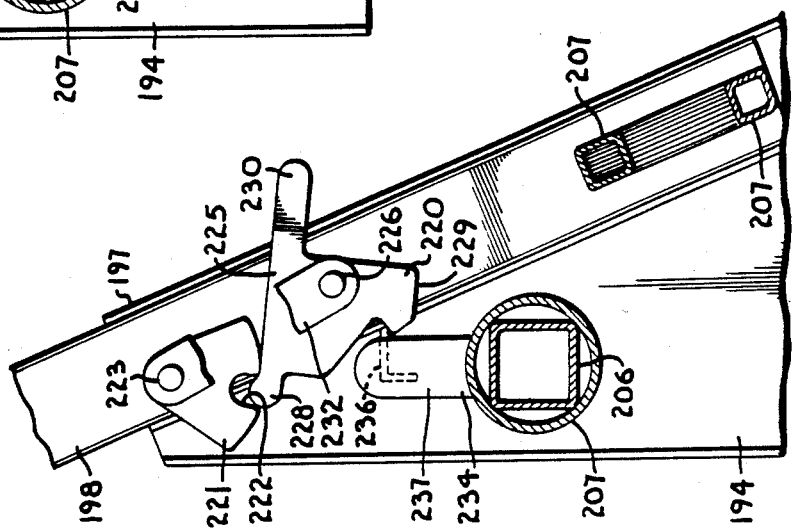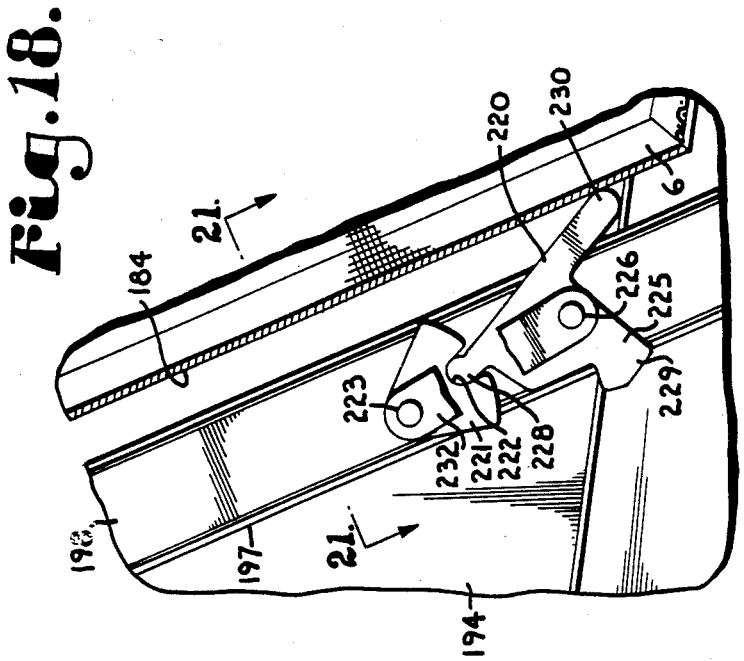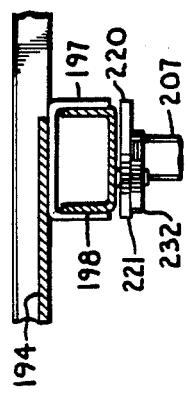

LITTER RETRIEVING MACHINE

FIELD OF THE INVENTION

This invention relates to a machine for retrieving litter from the ground and in particular, to a machine with drum mounted fingers which rolls over the ground and retrieves litter.

BACKGROUND OF THE INVENTION

Much manual effort is expended in collecting litter and other debris from large community areas such as along streets and highways, parks, playgrounds, beaches and open commercial areas. Because of the difficulty of designing a machine which will collect the various types and sizes of litter and operate over various types of surfaces, manual retrieval is the usual method for collection. However, manual retrieval methods are slow, expensive and many times are ineffective, particularly where large areas must be patrolled.

Machines have been designed to supplement or replace the need manually pick up of litter. An effective apparatus for litter retrieval is disclosed in U.S. Pat. No. 3,807,154 to Joseph L. Moore, issued Apr. 30, 1974 and assigned to the assignee of this application. This patent discloses the use of a towed apparatus having a rotatable drum which is rotated when in ground engagement. Flexible fingers extend radially from the drum and have a particular knob headed configuration for receiving bottles and cans which wedge between the fingers as the drum rolls over the ground. Bottles, cans and similar objects engaged by the drum and fingers are collected in a hopper after being stripped from between the fingers.

Although the device described in U.S. Pat. No. 3,807,154 is capable of retrieving some objects, such as bottles and cans, the effectiveness of the device has been less than completely satisfactory for other types of litter. Where the particular object cannot be grabbed between the resilient fingers extending from the drum, the apparatus may then fail to collect the debris.

An effective litter retrieving apparatus is also disclosed in U.S. patent Ser. No. 4,434,011 issued Feb. 28, 1984 to Joseph L. Moore and also assigned to the assignee of this application. This device includes a rotatable ground engaging drum acting with cooperating discs for collecting litter from the ground and directing such litter into a collector or a hopper. Another effective litter retrieving apparatus is also disclosed in the attached U.S. application Ser. No. 531,304 filed Sept. 9, 1983 by Joseph L. Moore and also assigned to the assignee of this application, such application being incorporated herein by reference. This apparatus includes a rotatable ground engaging drum in combination with a stripper mechanism including spring fingers which extend and retract relative to a carrier mechanism and which strips litter from between the fingers and directs litter to a conveyor.

The present application is directed to a litter retriever of the general form described in the prior Moore patents and application and in which the fingers are connected to the drum so they are easily removable and replaceable, reducing the costs of maintenence. The litter is stripped from between the fingers by a spring finger mechanism and deposited on a conveyor. The conveyor carries the material rearwardly and upwardly and into a collection hopper which, when full, is operated by an arrangement of linkage arms an pivots to raise upwardly, then swing rearwardly and tip to dump the litter.

OBJECTS OF THE INVENTION

The principle objects of the present invention are: to provide a litter retriever machine having a ground engageable drum with fingers to pick up litter; to provide such a litter retrieving machine with removable and replaceable fingers; to provide such a litter retrieving machine having channel members extending across its surface and with fingers which engage in the channel members; to provide such a litter retrieving machine having fingers with flanged bases to fit in the channel members extending across the surface of the ground; to provide such a litter retrieving having a hopper to dump material collected by the machine; and to provide such a litter retrieval machine which is sturdy and efficient in use and particularly well adapted for the intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE DRAWINGS

FIG. 1 is a side elevational view of a litter retriever machine embodying the present invention and with a pickup drum in an operating position.

FIG. 2 is a fragmentary, side elevational view of the litter retriever machine with the drum raised in a travel position.

FIG. 3 is a plan view of the litter retriever machine.

FIG. 4 is an enlarged, sectional view of a forward portion of the litter retriever machine taken along lines 4—4, FIG. 3.

FIG. 5 is an enlarged, cross-sectional view taken along line 5—5, FIG. 4.

FIG. 6. is an enlarged, fragmentary view of a portion of the litter retrieving machine showing details of a stripper plate arrangement and taken along lines 6—6, FIG. 5.

FIG. 7 is a cross-sectional view taken along line 7—7, FIG. 5.

FIG. 8 is a fragmentary, sectional view of a portion of the stripper mechanism and taken along lines 8—8, FIG. 7.

FIG. 9 is an enlarged, fragmentary view of the connection of stripper fingers to portions of the stripper mechanism.

FIG. 10 is a cross-sectional view taken along line 10—10, FIG. 9.

FIG. 11 is an enlarged, fragmentary sectional view of the ground engaging drum.

FIG. 12 is a detailed, fragmentary view of the ground engaging drum.

FIG. 13 is a detailed, fragmentary sectional view of the ground engaging drum taken along lines 13—13, FIG. 11.

FIG. 14 is a detailed, fragmentary side elevational view of a portion of the drive mechanism for the stripper plate assembly.

FIG. 15 is an enlarged plan view of the drive mechanism of the stripper plate assembly.

FIG. 16 is a side elevational, fragmentary view of the litter collection hopper in a partially raised position.

FIG. 17 is a fragmentary, sectional view of the litter collection hopper in a fully raised and rearwardly swung position.

FIG. 18 is an enlarged, sectional view of the hopper taken along lines 18—18, FIG. 3.

FIG. 19 is an enlarged, fragmentary view of the collection hopper shown in an upward position.

FIG. 20 is an enlarged, fragmentary view of the collection hopper shown in a further upward position.

FIG. 21 is a sectional view taken along lines 21—21, FIG. 18.

DESCRIPTION OF THE PREFERRED AND ALTERNATE EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

Reference numeral 1, FIGS. 1, 2 and 3, generally indicates a litter retriever machine embodying the present invention. The machine 1 includes a framework 2 for movement over a ground surface and which has mounted therein a ground engageable rotating drum 3 for picking up litter, a stripper means 4 for removing the litter from the pickup drum 3, and a conveyor means 5 for transporting the litter from the stripper means 4. A collection hopper 6 is mounted in the framework 2 and receives the litter from the conveyor means 5.

In the illustrated example, the framework 2 includes an upper horizontal beam structure 9 with opposite side beams 10 and 11. A rear end 12 has spaced downwardly extending side beams 13 and 14 with upwardly angled side beams 15 and 16 on the rearmost ends. An end beam 17 extends across the rear end 12 and joins the opposite side beams 15 and 16. At a front end 18, downwardly extending beams 19 and 20 connect the side beams 10 and 11 to a front crossbeam 21. Front converging beams 22 and 23 form a tongue assembly 24 including a hitch means for pulling by a tractor or truck, such as a ball hitch 25, FIG. 1.

To support the framework 2 above the ground surface, special wheels 29 and 30 are mounted on legs 31 and 32, and are respectively connected to the side beams 13 and 14. A sturdy crossbeam 34, such as of tubular construction for torque resistance extends between the side beams 13 and 14. An upper support structure 35 extends across the top at a midportion of the framework 2 and includes spaced opposite upwardly converging beams 36, 37, 38 and 39 connected at an apex by a crossbar 40. Spaced, substantially vertical, support beams 41 and 42 extend from the apex downwardly to the tubular crossbeam 34.

The ground engageable rotating drum 3 is mounted in the framework 2 generally at the front end 18. Referring to FIG. 1, the drum 3 includes a central axle 44 which is supported at opposite ends from the downwardly extending beams 19 and 20 by pivotally mounted arms 45 and 46. The arms are raised and lowered by hydraulic rams 48 extending upwardly and angularly between the downwardly extending beams 19 and 20 and the respective arms 45 and 46. The hydraulic rams 48 are actuated to lift the drum 3 from ground contact, as when the machine 1 travels down a roadway, FIG. 2, or to lower the drum 3 into ground contact, as when litter retrieval is desired, FIG. 1.

The drum 3 includes opposite, spaced, circular end plates 49 and 50 with lightening holes 51, FIG. 4. A central hub 52, FIG. 4, extends between the end plates 49 and 50 and a series of radially extending stiffener plates 53 are positioned at 120° angles about the hub 52 and are joined to the end plates 49 and 50. The axle 44 extends through the hub 52 and is connected on its opposite ends to the arms 45 and 46 by appropriate bearing pillow blocks 56, FIG. 1. As shown in FIGS. 3 and 4, the drum end plates 49 and 50 extend beyond their respective junctures with the radial stiffener plates 53 and opposite rims 48 and 59 are mounted on the periphery of the end plates 49 and 50. Each of the rims 58 and 59 have arcuate shaped leaves 60 partially punched from the material of the rim, such as by a cusp shaped die, and extending about the circumference of the rims 58 and 59. As disclosed herein below, the rims 58 and 59 extend above the adjoining surface of the drum 3 and generally coincide with the extent of the projection of the fingers mounted on the drum so that the rims 58 and 59 maintain a selected depth of engagement of the fingers with the ground. The leaves 60 extending about the rims 58 and 59 provided added ground engagement to ensure that the drum 3 does not skid on the ground surface.

FIGS. 11, 12 and 13 illustrate in detail the construction of the drum 3 and as shown therein, inner rings 62 are respectively connected, as by welding, to the inner surface of the respective end plates 49 and 50 and mounted concentrically to the hub 52. The rings 62 support a series of channel members 65 extending between the respective rings 62 on each of the end plates 49 and 50. The channel members 65 are connected at their opposite ends 66, as by welding, to the rings 62 and are positioned side-by-side and parallel about the entire circumference of the drum 3 so as to form an enclosure. The ends 66 are in the form of flat tangs overlying the adjoining surface of the rings 62 and the remainder of each channel member 65 is generally C-shaped in cross-section with spaced, overhanging flanges 67 and 68 forming a slot 69 therebetween and connected by a web 70. The web 70 is crowned, or bent slightly inwardly, toward the slot 69 to add structural rigidity to the channel member 65 and press against the base of the finger 73 as described below.

Still referring to FIGS. 11, 12 and 13, the fingers 73 are removeably and replaceably mounted in the channel members 65. Each of the fingers 73 includes a shaft 74 with an expanded conical tip 75 at one end and an expanded base 76 at the other end. The base 76 is generally square in configuration and the shaft 74 extends upwardly from the center of the base 76. The base 76 is sized to be snugly and slidably receivable within the channel member 65. Each finger 73 is preferrably formed of a resilient material such as neoprene and may break after extended usage. To replace one of the fingers 73, the intact fingers 73 are simply slid out of the respective channel members 65 until reaching and removing the broken finger 73 which can be removed in the same way. Replacement is by reversing the above steps. To block the ends 66 of the channel members 65, a clip 78 is utilized which has one lug portion extending over the finger base 76 and a second end portion lying flat against the channel member end 66. A bore in the clip aligns with a hole 63 in the inner ring 62 and a bolt 79 secures the clip 78, FIG. 13.

Referring to FIG. 4 in conjunction with FIGS. 5 through 10, the stripper means 4 is mounted rearwardly of the drum 3 and cooperates with the drum 3 to collect objects from the ground, carry them upwardly with the rotation of the drum 3 and direct them to the collection hopper 6. In the illustrated example, the stripper means 4 is a spring finger assembly including a forward assembly unit 82 and a rear assembly unit 83 mounted between a pair of side plates 84 and 85. The side plates 84 and 85 support a rotating shaft 87 extending therebetween and supported at opposite ends in bearings 88. The shaft 87 extends slightly beyond the side plate 84 and has a sprocket 89 mounted at an end. A second sprocket 90 is mounted on a stub shaft 91 connected to the side plate 84 and displaced rearwardly from the shaft 87. A drive chain 92 connects the sprockets 89 and 90 for powered rotation as explained herein below. The rotating shaft 87 has mounted adjacent its opposite ends circular plates 94 and mounted about the circumference of each of the circular plates 94 are a plurality of carrier stub shafts 95 which connect a like number of spring mount bars 97 extending substantially completely between the spaced circular plates 94. The spring mount bars preferably are of a material such as an angle beam and are pivotally connected to the circular plates via the carrier shafts 95. The spring mount bars with their attendant carrier shafts 95 are caused to rotate by a lever and a cam assembly as will be described below. Each of the carrier stub shafts 95 has a short lever or link 98 which is in turn connected to a second stub shaft 99 having a wheel 100 rotatably mounted on the end of the shaft. The wheels 100 comprise cam follower bearings and are mounted within a cam follower housing 102, FIG. 7 which is generally circular and with an inner race 103 defined by inner and outer walls 104 and 105. The race 103 has a substantially flat portion 106 positioned generally rearwardly or on the trailing area of the stripper means next adjacent to the conveyor means 5. The cam follower wheels 100 are mounted within the race 103 and as shown in FIG. 7, the inner wall 104 of the race 103 causes the links 98 to extend full outwardly as the cam follower wheels 100 pass over the curved surface and to swing inwardly or retract as the wheels 100 encounter the flat portion 106.

Mounted along the length of the spring mount bars 97 are spring teeth 108. Each of the spring teeth 108 includes a central bight portion 109, FIGS. 9 and 10, and spaced spring coils 110 extending into tines 111. Each tooth 110 is secured to the spring mount bar by a bolt 112. The distance between the mounting bolts 112 and the tines 111 is carefully controlled so as to mount a series of stripper plates 115.

Each of the stripper plates 115 is generally in the form of a sidewardly mounted U with a curvature portion 116 extending toward the drum 3 and the spaced legs 117 and 118 extending rearwardly. The legs 117 and 118 are mounted at their remote ends to a crossplate 119, FIG. 4, extending between the side plates 84 and 85. Each of the stripper plates 115 is generally U shaped in cross section, narrow, and positioned generally parallel to beside and adjoining stripper plate, leaving a slot 120 therebetween. The bight portion 109 of the spring tooth 108 is generally positioned under and in registration with an according stripper plate 115 and the tines 111 protrude through the slots 120, FIG. 5. The spacing of the fingers 73 and spring teeth 108 is such that the spring teeth 108 extend between and rake the fingers 73 to dislodge litter wedged and picked up therein. The spring teeth 108 partially throw and partially carry the dislodged litter rearwardly, FIG. 4, and down an incline formed by the stripper plates 115 to the awaiting conveyor means 5. As the teeth 108 sweep rearwardly, they swing upwardly and retract as the cam follower wheels 100 encounter the flat portion 106 in the cam follower housing 102. This retraction feature provides a shorter overall length for the stripper means 4, permitting the conveyor means 5 to be positioned very close to the drum 3 and resulting in a shorter overall length of the litter retriever machine 1.

To aid in dislodging litter articles stuck between the fingers 73 such as soft drink cans and bottles, a picker bar 124, FIG. 4, extends generally across an upper portion of the framework 2 and has a series of open tubes 125 extending angularly downwardly. Resilient teeth 126, such as of neoprene, also are received within the open ends of the tubes 125. The teeth 126 are similar in form to the fingers 73 but lack the bases 76 so that they can be inserted in the tubes 125. The teeth 126 are positioned so that they extend between the rows of fingers 73 on the drum 3 and tend to comb and dislodge litter material stuck between the fingers 73. Litter dislodged by the kicker bar arrangement falls onto the stripper means 4, described above, for transfer to the conveyor means 5.

The entire stripper means 4 is moved upwardly and downwardly within the framework 2 to position the spring teeth 108 into and out of ground engagement. As shown in FIGS. 1 and 2, the side plates 84 and 85 are pivotally mounted at their front ends 128 to the drum axle 44 and accordingly the front end 128 of the stripper means 4 is carried up and down with movement of the drum 3 relative to the framework 2. The rear end 129 also moves upwardly and downwardly independently of upward and downward movement of the drum 3. In the illustrated example, a lift means for the rear end of the stripper means 4 includes a ram 130 mounted in an upper part of the framework 2 and having a flexible connector such as a chain 131 extending downwardly from the ram 130 and connected to the rear end 129.

Additionally, and so that the full weight of the stripper means 4 is not hanging upon the chain 131 when in its normally operative or bottomed out position, and a rest arm is provided. In the illustrated example, beams 133 extend downwardly from the upwardly converging beams 36 and 37 and have short arms (not shown) extending inwardly and centrally therefrom. The side plates 84 and 85 include a fork with catches to engage with the stub arms (not shown) so that the rear end 129 rests solidly upon structural members in a bottomed out position.

As heretofore described, the stripper means 4 tends to direct litter rearwardly and onto a conveyor means 5. In the illustrated example, the conveyor means 5 includes opposite side plates 137 positioned on and forming opposite sides of the conveyor means 5 and having upper areas 138 forming guides for sliding of litter material as it progresses up the conveyor means 5. Mounted atop the guide area 138 are screens 139 such as of expanded metal material also to contain litter. The conveyor means 5 includes a rigid bottom plate 141, curved at a forward nose portion 142, which provides structural rigidity to the conveyor means 5. Forward and rear rotating shafts 144 and 145 extend between the side plates 137 and are suitably mounted in bearings 146. The conveyor means 5 includes an upper slide plate 148 extending between the side plates and curving over the opposite ends of the conveyor and on which the litter slides as it is carried.

The forward and rear rotating shafts 144 and 145 have chain sprockets 149 affixed at opposite ends and which drive respective chains 150. Sweep bars 153 are mounted to the opposite chains 150 at intervals therealong so as to engage and sweep the refuse upwardly along the slide plate 148.

To provide power for the stripper means 4, and the conveyor means 5, appropriate drive means are utilized. In the illustrated example, power for the stripper means 4 is accomplished by a chain drive system from the drum 3. In the illustrated example, a sprocket 155, FIG. 1, is affixed to the drum axle 44 and a sprocket 156 is mounted on the stripper means shaft 87. Upper and lower idler pulleys 157 are positioned adjacent the sprocket 156 and a drive chain 158 extends between the sprocket 155 and 156 and wraps around the idler pulleys 157. The placement of the idler pulleys 157 rearwardly of the sprocket 156 is such that the stripper means 4 rotates opposite to the direction of rotation of the drum 3, FIG. 4.

The drive arrangement for the conveyor means 5 uses as its source of power the rotation of the framework wheel 29. A rotatable wheel 160 is mounted on a swingable arm assembly 161 in selective engagement with the wheel 29. In the illustrated example, the swingable arm assembly 161 is pivotally mounted to the side beam 13 by spaced ears 162, FIG. 15. A rotatable shaft 164 extends between the ears 162 and carries a cradle 165 having a central shaft 166 to which the wheel 160 is non-rotatably mounted. An end plate 168 closes the end of the cradle 165 and has a lever arm 169 extending therefrom. A hydraulic ram 170 extends between the lever arm 169 and the side beam 13 and retracts and extends to swing the cradle 165 upwardly and downwardly and to move the wheel 160 accordingly. The wheel 160 has a relatively broad outer surface, FIG. 15, and a series of parallel lugs or ribs 172 are formed on the surface of the wheel 160 to increase friction between the drive wheel 160 and the framework wheel 29 so that as the wheel 29 rotates as the framework 2 is moved over a ground surface, the wheel 160 also rotates. Mounted on the end of the central shaft 166 to which the wheel 160 is affixed, is a sprocket 163 connected by a first drive chain 174 to a second sprocket 175 mounted on the shaft 164. Mounted on the end of the shaft 164 is a transfer sprocket 176 which in turn is connected to a drive chain 177. A drive chain 177 is connected to a pair of idler sprockets 178, FIGS. 1 and 2 and power is finally transmitted to a drive sprocket 179 mounted on the end of the conveyor rear shaft 145 via a drive chain 180.

Thus, when the ram 170 is extended, the wheel 160 engages the framework ground engaging wheel 29 and rotates, causing the aforementioned assembly of sprockets and drive chains to cause the conveyor means 5 to become powered and transfer litter from the stripper means 4 to the collection hopper 6.

The hopper 6 is mounted rearwardly of the conveyor means 5 in the framework 2 and, in the illustrated example, FIGS. 16 and 17, has opposite sides 182, front and rear walls 183 and 184, an open top 185, and a front chute 186 which communicates with the outlet end of the conveyor means 5. The bottom of the hopper 6 is formed of angled plates 187 and 188. The hopper 6 is substantially formed of expanded metal for reduction of weight and has ribs 190 formed on flat wall surfaces and angle beams 191 positioned at the corner intersections of the various walls.

To position the hopper 6 relative to the framework rear end 12, and provide supports and means for raising, swinging and dumping the hopper 6, the framework rear end 12 has spaced, upwardly extending standards 193 and 194 which are substantially triangular in shape and have respective upwardly and rearwardly inclined surfaces 195. On interior sides of the standards 193 and 194 adjacent the incline surfaces 195, the standards 193 and 194 include ways 197 formed of inwardly facing channel beams, FIG. 17, and in which are respectively received elongate beams forming slide members 198. There are two slide members 198, one for each of the standards 193 and 194 and the slide members 198 connect to the hopper 6 at an upper rear corner 199. The upper rear corner 199 has a reinforcing plate 200 with an ear 201 extending therefrom and to which the slide member 198 is connected by a pivot shaft 202. Cross braces 207 extend between the slide members 198.

To lift the hopper 6, a pivot link arm arrangement is utilized on each side and in the illustrated example, includes a respective first link arm 204 having a shoulder joint end 205 secured adjacent the exterior side of each of the standards 193 and 194 to a axle shaft 206 extending through a cross support 207, preferably in the form of a pipe beam to resist torque, and extending between the standards 193 and 194. The axle shaft 206 is of particularly sturdy and heavy construction to bear the weight of the hopper 6 when it swings upwardly and ensures that the spaced link arms 204 rotate in unison. Each first link arm 204 extends forwardly and an ear 208 projects downwardly from the approximate midportion of the first link arm 204. A hydraulic ram 209 is pivotally connected to the ear 208 and mounted at a lower end to the adjoining side beam 15 or 16 by a shaft 210.

Each first link arm 204 extends forwardly and ends at an elbow joint end 212 with a pivot 213 connecting the first link arm 204 to a second link arm 214. The second link arm 214 is connected at an upper end 215 to the reinforcing plate 200 by a pivot arrangement 216 which is spaced forwardly of the pivot shaft 202 so that a generally parallelogram linkage arrangement is defined. Accordingly, in operation the ram 209 extends to swing the first link arm 204 upwardly which causes the slide members 198 to move upwardly in the ways 197 and the hopper 6 to move generally upwardly and at a slight rearward angle. As the ram 209 continues to extend, the first link arm 204 begins to swing rearwardly and the second link arm 214 then swings upwardly relative to the slide member 198 causing the hopper 6 to pivot on the shaft 202 and swing further upwardly and rearwardly to a dumping position, FIG. 17.

To aid in initiation of rearward swinging or tilting of the hopper 6, a latch mechanism 220 is employed which indirectly extends between the hopper 6 and the framework standards 193 and 194. In the illustrated example, FIGS. 19-21, the latch mechanism 220 includes a bell shaped top latch piece 221 with a middle recess 222 and which is swingably mounted to one of the slide members 198 by a pivot pin 226 and includes a tang 228 receivable in the recess 222, a projecting catch portion 229 and a lever arm 230 extending outwardly and toward the hopper 6. An outer link 232 connects the pivot pins 223 and 226.

Complementary latch portions 234 are mounted on the standards 193 and 194 and in the illustrated example include a catch plate 236 extending from the standard 193 toward the longitudinal centerline of the framework 1. The catch plate 236 is positioned upwardly and adjacent the cross support 207 and is supported at an inner end by a support plate 237 extending downwardly to the cross support 207.

In operation of the latch mechanism 220, as the slide members 198 extend upwardly during the raising operation of the hopper 6, the catch portion 229 is extended outwardly beyond the side margin of the slide member 198 by the rear wall 184 of the hopper 6 pressing against the lever arm 230, FIG. 18. As the slide member 198 travels upwardly through operation of the pivot link arm arrangement as heretofore described, the catch portion 229 engages the catch plate 236 on the standard 193. The catch plate 236 is relatively precisely positioned so as to be engaged by the catch portion 229 when the pivot link arm arrangement has generally reached full upward travel, FIG. 19. The catch action urges the first and second link arms 204 and 214 into an over center or rearwardly swinging position. As the hopper 6 begins to tilt rearwardly, the rear wall 184 swings away and releases the lever arm 230, FIG. 20, whereby the hopper 6 may extend upwardly a short distance more.

The litter retriever machine 1 disclosed herein provides a device which effectively collects litter and other objects from the ground surface. Litter materials picked up by the drum 3 are readily removed by the stripper means 4, carried by the conveyor means 5 and deposited in the hopper 6 for collection and later disposal. Thus, where other devices have encountered problems with both the retrieval of objects from the ground surface and shedding of such objects once they have been grasped by the apparatus, the present invention accomplishes both. The present invention provides a drum with the fingers 73 and as the machine 1 traverses the ground surface, the fingers 73 act to lift paper and other litter, and that paper which is not grasped by the fingers 73 is picked up by the spring teeth 108 and carried upwardly. It is not necessary that the paper or other debris be spiked by the spring teeth 108 but merely conveyed upwardly as a result of entrapping between the spring teeth 108 and the fingers 73.

At the upper point of their movement, bottles and cans and other debris which are grasped by the fingers 73 are stripped therefrom by the spring teeth 108 and the teeth 126 extending from the kicker bar 124. These units direct the debris onto the stripper plates 115 where it is kicked rearwardly, picked up by the conveyor means 5 and carried upwardly into the hopper 6 for later disposal.

While the apparatus of the present invention has been described as used in the retrieval of litter, it has been found that the machine is ideally suited for collecting agricultural products from the ground such as loose ears of corn, sugar beets and other such objects which may be left in the field after the main picking operation.

It is to be understood that while certain forms of the present invention have been illustrated and described herein, it is not to be limited to the specific forms or arrangement of parts described and shown, except insofar as such limitations are included in the following claims.

What is claimed and desired to be secured by Letters Patent is as follows:

1. A litter retrieving machine comprising:
 (a) a framework for movement over a ground surface;
 (b) a ground engageable rotating drum mounted in said framework and having a plurality of fingers mounted to said drum for engagement and retrieval of litter;
 (c) stripper means for removing said litter from between said fingers;
 (d) conveyor means for transporting said litter from said stripper means;
 (e) a hopper mounted in said framework and communicating with said conveyor means;
 (f) a mechanism for lifting and dumping said hopper extending between said hopper and said framework and including a jointed arm arrangement having an upper arm member with one end pivotally mounted to said hopper and a lower arm member with one end pivotally mounted to said framework; said upper and lower arm members being connected at an elbow joint;
 (g) pivot means extending between said framework and said hopper; and
 (h) said mechanism including motive means extending between said framework and said lower arm member and connected to said lower arm member at a pivot point positioned between said one end and said elbow joint; said motive means being operable to using said lower arm member upwardly to cause said upper and lower arm members to extend about said elbow joint, urge said hopper upwardly, and swing said hopper about said pivot means to dump the materials therein.

2. A litter retrieving machine comprising:
 (a) a framework for movement over a ground surface;
 (b) a ground engageable rotating drum mounted in said framework and having a plurality of channel members extending across the surface of said drum;
 (c) a plurality of fingers mounted to said drum for engagement and retrieval of litter and having bases slidably mounted in said channel members for ease of removal and replacement of said fingers;
 (d) stripper means for removing said litter from between said fingers;
 (e) conveyor means for transporting said litter from said stripper means;
 (f) a hopper mounted in said framework and communicating with said conveyor means;
 (g) a mechanism for lifting and dumping said hopper extending between said hopper and said framework and including a jointed arm arrangement having an upper arm member with one end pivotally mounted to said hopper and a lower arm member with one end pivotally mounted to said framework; said upper and lower arm members being connected at an elbow joint;
 (h) pivot means extending between said framework and said hopper; and
 (i) said mechanism including motive means extending between said framework and said lower arm member and connected to said lower arm member at a pivot point positioned between said one end and said elbow joint; said motive means being operable to swing said lower arm member upwardly to cause said upper and lower arm members to extend about said elbow joint, urge said hopper upwardly, and swing said hopper rearwardly about said pivot means to dump the materials therein.

3. A load carrying transporter comprising:
(a) a framework for movement over a ground surface;
(b) a hopper mounted in said framework for holding materials;
(c) a mechanism for lifting and dumping said hopper extending between said hopper and said framework and including a jointed arm arrangement having an upper arm member with one end pivotally mounted to said hopper and a lower arm member with one end pivotally mounted to said framework; said upper and lower arm members being connected at an elbow joint;
(d) pivot means extending between said framework and said hopper;
(e) said mechanism including motive means extending between said framework and said lower arm member and connected to said lower arm member at a pivot point positioned between said one end and said elbow joint; said motive means being operable to swing said lower arm member upwardly to cause said upper and lower arm members to extend about said elbow joint, urge said hopper upwardly, and swing said hopper about said pivot means to dump materials therein; and
(f) a latch means extending between said framework and said hopper and having arm means outwardly swingable to urge said hopper outwardly as said hopper is being raised, thereby urging said upper arm member to swing at said elbow joint relative to said lower arm member and commence tilting of said hopper.

4. A load carrying transporter comprising:
(a) a framework for movement over a ground surface;
(b) a hopper mounted in said framework for holding materials;
(c) a mechanism for lifting and dumping said hopper extending between said hopper and said framework and including a slide member movable upwardly and downwardly and having a top end with said hopper pivotally mounted thereto and a jointed arm arrangement having an upper arm member with one end pivotally mounted to said hopper spaced from said slide member top end and a lower arm member with one end pivotally mounted to said framework; said upper and lower arm members being connected at an elbow joint;
(d) pivot means extending between said framework and said hopper;
(e) said mechanism including motive means extending between said framework and said lower arm member and connected to said lower arm member at a pivot point positioned between said one end and said elbow joint; said motive means being operable to swing said lower arm member upwardly to cause said upper and lower arm members to extend about said elbow joint, urge said hopper upwardly, and swing said hopper about said pivot means to dump materials therein; and
(f) a latch means mounted on said slide member and extending between said framework and said hopper, said latch means including an abutment means, an outwardly swingable latch arm, and a catch mounted on said framework whereby when said abutment means engages said catch as said slide member and said hopper are being raised, said latch arm swings outwardly and urges said hopper outwardly, thereby inducing tilting of said hopper about the top end of said slide member.

* * * * *